(12) United States Patent
Hashida et al.

(10) Patent No.: US 9,238,986 B2
(45) Date of Patent: Jan. 19, 2016

(54) CONTROL DEVICE FOR INTERNAL COMBUSTION ENGINE

(75) Inventors: Tatsuhiro Hashida, Susono (JP); Hiroki Nishijima, Suntou-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/360,131

(22) PCT Filed: Nov. 25, 2011

(86) PCT No.: PCT/JP2011/077210
§ 371 (c)(1),
(2), (4) Date: Aug. 25, 2014

(87) PCT Pub. No.: WO2013/076869
PCT Pub. Date: May 30, 2013

(65) Prior Publication Data
US 2014/0366511 A1    Dec. 18, 2014

(51) Int. Cl.
| | |
|---|---|
| *F01N 3/00* | (2006.01) |
| *F01N 11/00* | (2006.01) |
| *F01N 3/023* | (2006.01) |
| *F01N 3/20* | (2006.01) |
| *F01N 3/035* | (2006.01) |

(52) U.S. Cl.
CPC .............. *F01N 11/007* (2013.01); *F01N 3/023* (2013.01); *F01N 3/035* (2013.01); *F01N 3/208* (2013.01); *F01N 11/00* (2013.01); *F01N 2250/02* (2013.01); *F01N 2550/04* (2013.01); *F01N 2560/05* (2013.01); *Y02T 10/24* (2013.01); *Y02T 10/47* (2013.01)

(58) Field of Classification Search
USPC ............. 60/274, 277, 286, 295, 297, 301, 303
See application file for complete search history.

(56) References Cited

U.S. PATENT DOCUMENTS

| | | | | |
|---|---|---|---|---|
| 7,832,200 | B2* | 11/2010 | Kesse et al. ................ | 60/286 |
| 7,987,662 | B2* | 8/2011 | Ruona .......................... | 60/286 |
| 8,151,560 | B2* | 4/2012 | Zanini-Fisher et al. ...... | 60/297 |
| 8,181,452 | B2* | 5/2012 | Bidner et al. ................ | 60/295 |
| 8,384,397 | B2* | 2/2013 | Bromberg et al. .......... | 324/636 |
| 2011/0320171 | A1 | 12/2011 | Okayama et al. | |

FOREIGN PATENT DOCUMENTS

| | | |
|---|---|---|
| JP | 2009-144577 A | 7/2009 |
| JP | 2010-229957 A | 10/2010 |
| JP | 2011-021479 A | 2/2011 |
| JP | 2011-185167 A | 9/2011 |

* cited by examiner

*Primary Examiner* — Binh Q Tran
(74) *Attorney, Agent, or Firm* — Kenyon & Kenyon LLP

(57) ABSTRACT

A control device for an internal combustion engine includes a SCR system disposed in an exhaust passage and a particulate matter sensor disposed downstream of the SCR system. The control device applies a particulate matter trapping voltage to the particulate matter sensor, and acquires an output of the particulate matter sensor at a first timing after the start of application of the particulate matter trapping voltage. The control device executes predetermined control in accordance with the output. If a second timing at which an integrated operating time period of the internal combustion engine in a predetermined operating state in which urea-related substances discharged to downstream of the SCR system increase reaches a reference time period after starting application of the particulate matter trapping voltage is earlier than the first timing, the control device stops the predetermined control.

6 Claims, 7 Drawing Sheets

CONTROL DEVICE FOR INTERNAL COMBUSTION ENGINE

CROSS-REFERENCE TO RELATED APPLICATIONS

This is a national phase application based on the PCT International Patent Application No. PCT/JP2011/077210 filed on Nov. 25, 2011, the entire contents of which are incorporated herein by reference.

TECHNICAL FIELD

The present invention relates to a control device for an internal combustion engine. More particularly, the present invention relates to a control device that controls an internal combustion engine that includes a particulate matter sensor in an exhaust passage.

BACKGROUND ART

For example, in a system disclosed in Patent Literature 1, a PM sensor (particulate matter sensor) is provided for detecting particulate matter (hereunder, also referred to as "PM") in an exhaust passage of an internal combustion engine. The aforementioned PM sensor includes an insulating substrate and a pair of electrodes that are disposed on the insulating substrate with a space therebetween.

When PM contained in exhaust gas accumulates between the pair of electrodes of the PM sensor, the electrical conductivity between the electrodes changes. There is a certain correlation between the accumulated PM amount and the electrical conductivity between the electrodes, and the resistance between the electrodes changes in accordance with a PM accumulation amount between the electrodes. There is also a correlation between an accumulated PM amount between the electrodes and a PM amount contained in the exhaust gas. Accordingly, a PM amount contained in the exhaust gas is detected by detecting a resistance value between the electrodes of the PM sensor.

In the technology disclosed in Patent Literature 1, the PM sensor is disposed downstream of a diesel particulate filter (hereunder, also referred to as "DPF"). In the system disclosed in Patent Literature 1, determination of the existence or non-existence of a malfunction of the DPF and the like is executed by detecting a PM amount discharged on the downstream side of the DPF, based on the resistance value between the electrodes of the PM sensor.

CITATION LIST

Patent Literature

Patent Literature 1: Japanese Patent Laid-Open No. 2009-144577

SUMMARY OF INVENTION

Technical Problem

In some systems, a urea SCR (selective catalytic reduction) system for NOx purification is disposed in an exhaust passage of an internal combustion engine, and a PM sensor is disposed downstream thereof. In an SCR system, urea water is supplied by injection to an exhaust passage, and NOx is reduced in a catalyst by ammonia that is generated from the urea water.

However, in some cases the supplied urea and urea-derived substances (hereunder, urea and urea-derived substances may also be referred to collectively as "urea-related substances") pass through the SCR system and are discharged on the downstream side thereof. If the urea-related substances discharged on the downstream side adhere to the electrodes of the PM sensor, the urea-related substances will cause a resistance value between the electrodes of the PM sensor to change. As a result, variations may arise in the output of the PM sensor and the sensitivity of the PM sensor may decrease. Variations in the output of the PM sensor or a decrease in the sensitivity thereof are not desirable since, for example, a situation can arise in which such output variations or decrease in sensitivity cause an erroneous determination with respect to detection of a malfunction of the DPF.

An object of the present invention is to solve the above described problem, and the present invention provides a control device for an internal combustion engine that has been improved so as to be capable of suppressing an influence produced by adherence of urea-related substances to electrodes of a PM sensor, and performing detection of a PM amount and detection of a malfunction of a DPF with greater accuracy.

Solution to Problem

To achieve the above described object, the present invention provides a control device for an internal combustion engine that controls an internal combustion engine that includes an SCR system disposed in an exhaust passage of the internal combustion engine and a particulate matter sensor disposed downstream of the SCR system, the control device including: means for applying a particulate trapping voltage to the particulate matter sensor; and means for executing predetermined control in accordance with an output of the particulate matter sensor at a first timing after starting application of the particulate trapping voltage. The control device for an internal combustion engine of the present invention further includes means for stopping the predetermined control in a case where a second timing at which an integrated operating time period of the internal combustion engine in a predetermined operating state in which urea-related substances that are discharged downstream of the SCR system increase reaches a reference time period from a time at which application of the particulate trapping voltage starts is earlier than the first timing. In this case, the term "stopping" predetermined control includes long-term and continuous stopping of the predetermined control and short-term stopping of the predetermined control, for example, temporary stopping in a case of changing the timing of the control and executing the control thereafter. Further, the term "urea-related substances" includes urea and substances derived from urea water supplied to the SCR system.

The control device for an internal combustion engine of the present invention may further include means for executing control that, in a case where the second timing is earlier than the first timing, raises a temperature of an element portion of the particulate matter sensor to thereby combust and remove particulate matter that accumulates in the particulate matter sensor.

In addition, the control device for an internal combustion engine of the present invention can be suitably applied to an internal combustion engine in which a diesel particulate filter for trapping particulate matter is disposed upstream of a particulate matter sensor in an exhaust passage. In this case, the "predetermined control" according to the present invention may be control that determines the existence or non-existence of a malfunction of the diesel particulate filter based on the output of the particulate matter sensor.

In this case, the control device for an internal combustion engine of the present invention may further include means for estimating an integrated discharge amount that is an integrated amount of particulate matter discharged from the internal combustion engine after starting application of the particulate trapping voltage, and the first timing can be a time at which the integrated discharge amount reaches a reference amount.

The control device for an internal combustion engine of the present invention can also be configured to further include means for executing predetermined control in accordance with an output of the particulate matter sensor at the second timing in a case where the second timing is earlier than the first timing.

In addition, the control device for an internal combustion engine of the present invention can be configured to further include means for estimating an integrated discharge amount that is an integrated amount of particulate matter discharged from the internal combustion engine after starting application of the particulate trapping voltage, and means for setting the reference time period in accordance with the integrated discharge amount.

Advantageous Effects of Invention

If an operating time period of an internal combustion engine is long under an environment in which urea-related substances are discharged, deviations may arise in the output of a particulate matter sensor because the amount of urea-related substances that accumulate in the particulate matter sensor increases. In this respect, according to the present embodiment, if an integrated operating time period reaches a reference time period in an operating state in which discharge of urea-related substances is increasing prior to a timing at which to detect the output of a particulate matter sensor for predetermined control, the predetermined control is stopped. Accordingly, in a case where it is possible for deviations to arise in the sensor output due to the accumulation of urea-related substances, performance of the predetermined control can be suppressed in accordance with the sensor output. Thus, a decrease in the accuracy of the predetermined control is suppressed.

Further, in the present invention, with respect to execution of control that combusts and removes particulate matter that accumulates in the particulate matter sensor if the integrated operating time period reaches the reference time period in an operating state in which the discharge of urea-related substances is increasing prior to a first timing at which to detect the output of the particulate matter sensor for the predetermined control, the urea-related substances can be removed together with particulate matter that adheres to an element portion of the particulate matter sensor. Accordingly, urea-related substances can be efficiently removed, and the occurrence of deviations in the output of the particulate matter sensor can be effectively suppressed.

In the present invention, with respect to the configuration adapted to perform malfunction detection control with respect to a diesel particulate filter as the predetermined control, the occurrence of an erroneous determination relating to the existence or non-existence of a malfunction that is due to sensor output in which a deviation arose due to accumulation of urea-related substances can be suppressed.

In the present invention, with respect to the configuration adapted to set a reference time period in accordance with a particulate matter amount that is discharged from the internal combustion engine, for example, the influence of urea-related substances can be checked at an earlier stage in a case such as when an operating state in which urea-related substances increase occurs frequently, and various kinds of control can be efficiently executed.

DESCRIPTION OF EMBODIMENTS

Figure 1:
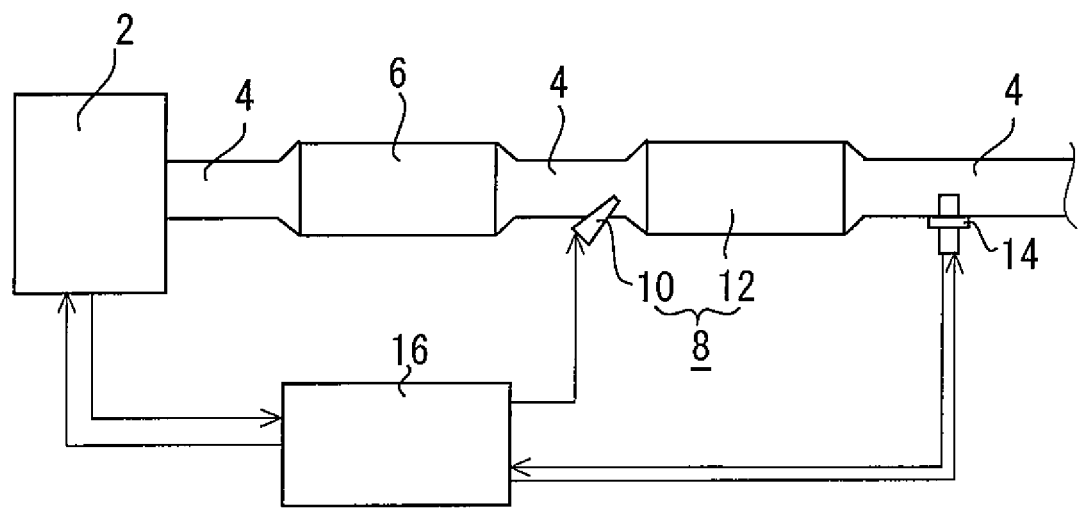
FIG. 1 is a view for describing the overall configuration of a system of Embodiment 1 of the present invention.

Embodiments of the present invention are described hereunder with reference to the accompanying drawings. For each of the drawings, the same or corresponding portions are denoted by the same reference numerals, and a description of such portions is simplified or omitted.

Embodiment 1

Overall Configuration of System of Embodiment 1

FIG. 1 is a view for describing the overall configuration of a system of Embodiment 1 of the present invention. The system illustrated in FIG. 1 is mounted in a vehicle or the like and used. In the system illustrated in FIG. 1, a diesel particulate filter (DPF) 6 is arranged in an exhaust passage 4 of an internal combustion engine 2. The DPF 6 is a filter that traps particulate matter (PM) that is particle-like material contained in exhaust gas.

A urea SCR system 8 (hereunder, also referred to as "SCR system") is disposed downstream of the DPF 6 in the exhaust passage 4. The SCR system 8 includes a injection valve 10 that injects urea water and is disposed in the exhaust passage 4, and a selective reduction NOx catalyst 12 (hereunder, also referred to simply as "NOx catalyst") that is disposed downstream of the injection valve 10 in the exhaust passage 4. The injection valve 10 is connected to a urea water tank that is not illustrated in the drawings, and injects urea water inside the exhaust passage 4 on the upstream side of the NOx catalyst 12. As described later, the injected urea water is decomposed and ammonia is generated. The NOx catalyst 12 reduces NOx contained in exhaust gas by utilizing the ammonia as a reducing agent, to thereby purify the exhaust gas. A PM sensor (particulate matter sensor) 14 is arranged downstream of the NOx catalyst 12.

This system includes a control device 16. In addition to the PM sensor 14, various sensors of the internal combustion engine 2 are connected to the input side of the control device 16. Further, an electric circuit of the PM sensor 14, the injection valve 10, and various other actuators of the internal combustion engine 2 are connected to the output side of the control device 16. The control device 16 executes a predetermined program based on information inputted from the various sensors to actuate various actuators and the like and thereby execute various kinds of control relating to operation of the internal combustion engine 2.

Figure 2:
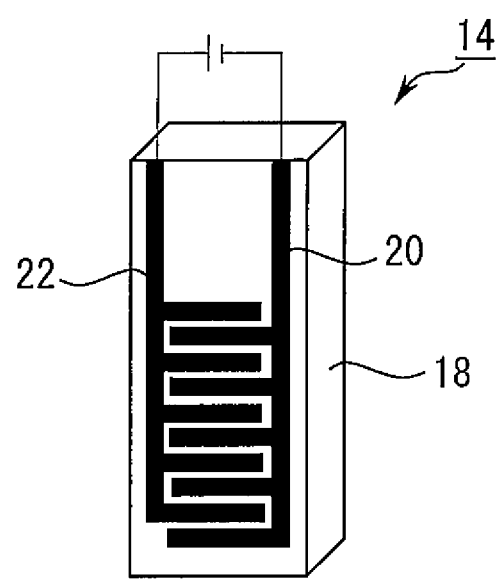
FIG. 2 is a schematic view for describing the configuration of an element portion of the PM sensor of Embodiment 1 of the present embodiment.

FIG. 2 is a schematic view for describing the configuration of an element portion of the PM sensor 14 of the present embodiment. As shown in FIG. 2, the element portion of the PM sensor 14 includes an insulating substrate 18. A pair of electrodes 20 and 22 is formed on the surface of the insulating substrate 18. The pair of electrodes 20 and 22 is disposed with a certain interval therebetween in a state in which the electrodes 20 and 22 do not contact each other. Each of the electrodes 20 and 22 has a portion that is formed in a comb-tooth shape, and the electrodes 20 and 22 are formed as though to mesh with each other at the aforementioned portion. Note that although the electrodes 20 and 22 that have a comb-tooth shape are exemplified according to the present embodiment, the present invention is not limited to this shape, and the pair of electrodes may have any shape as long as the pair of electrodes face each other. A heater that is not illustrated in the drawings is embedded in a layer below the electrodes 20 and 22 inside the insulating substrate 18.

The pair of electrodes 20 and 22 are connected to a power source (not illustrated in the drawings) through an electric circuit or the like. A high voltage is thereby applied between the electrode 20 and the electrode 22. The heater is also connected to a power source (not illustrated in the drawings) through an electric circuit or the like, and a predetermined electric power is thereby supplied to the heater and, as a result, the element portion is heated. These electric power supplies are controlled by the control device 16.

[Outline of Control in Embodiment 1]

In the present embodiment, control that the control device 16 performs includes control to detect a PM amount, reset the PM sensor 14, detect a malfunction of the DPF 6, and regenerate the DPF 6 as described below.

Note that in the embodiment below, it is assumed that the PM that is the trapping object of the DPF 6 and the measurement object of the PM sensor 14 refers to a particulate matter that is discharged from the internal combustion engine 2 accompanying operation of the internal combustion engine 2, such as substances produced by combustion of the internal combustion engine such as soot (a soot-like substance such as carbon) or soluble organic fraction (SOF), or ash (soot) derived from lubricating oil.

(1) Detection of PM Amount

When detecting a PM discharge amount, a "trapping voltage" that is a high voltage for trapping PM is applied between the electrodes 20 and 22. When the trapping voltage is applied between the electrodes 20 and 22, PM contained in exhaust gas is trapped and accumulates between the electrodes 20 and 22. As the PM accumulating between the electrodes 20 and 22 increases, conducting locations between the electrodes 20 and 22 increase, and a resistance value between the electrodes 20 and 22 decreases.

According to the present embodiment 1, an electrical characteristic that has a correlation with the resistance between the electrodes 20 and 22 is detected as a sensor output of the PM sensor 14. A PM amount that has accumulated at the electrodes 20 and 22 is detected based on this output of the PM sensor 14 (hereunder, may also be referred to as "sensor output"). A PM amount that accumulates at the electrodes 20 and 22 varies in accordance with variations in the PM amount contained in the exhaust gas. Therefore, a PM amount that is detected based on the sensor output is taken as an indicator of a PM amount that was discharged to the downstream side of the DPF 6.

Note that, in the following embodiment, for convenience, the sensor output is described as a value that increases as the PM accumulation amount between the electrodes 20 and 22 increases. However, the present invention is not limited thereto, and conversely a configuration may be adopted in which an electrical characteristic that decreases as the PM amount increases is taken as the output.

(2) PM Resetting (Control that Combusts and Removes Particulate Matter)

The sensor output increases as a PM accumulation amount between the electrodes 20 and 22 increases. However, when the accumulation amount between the electrodes 20 and 22 reaches a limit value, the sensor output no longer changes. In this state, the PM sensor 14 can no longer emit an output that is in accordance with the PM amount contained in the exhaust gas. Accordingly, at a predetermined timing, it is necessary to remove the PM that is accumulating in the element portion. This process that removes the PM is also referred to as "PM resetting".

When performing PM resetting, the control device 16 supplies a predetermined electric power to the heater of the PM sensor 14, and raises the temperature of the element portion of the PM sensor 14 to an overheating temperature that is a temperature at which the PM is combusted and removed. As a result, PM that adhered to the element portion of the PM sensor 14 is combusted and removed. Note that, in this case, it is assumed that the temperature of the element portion during the PM resetting period is higher than 500° C., and more preferably is higher than 700° C. Alternatively, a configuration may be adopted in which a target temperature of the element portion during the PM resetting period is set to a temperature that is higher than 500° C., more preferably a temperature that is higher than 700° C., and electric power is supplied to the heater. Since a temperature at which PM combusts is between approximately 500 and 650° C., if the resetting temperature is made 700° C. or more (preferably, between 700 and 800° C.), the reliability of the PM combustion can be increased.

Since PM that accumulated at the element portion of the PM sensor 14 is removed by performing the PM resetting, the PM resetting is executed at various timings, for example, before starting malfunction detection with respect to the DPF 6 that is described below, or after starting the malfunction detection, or in addition, after performing regenerative processing with respect to the DPF 6 in which PM adhering to the DPF 6 is combusted and removed or the like.

(3) DPF Malfunction Detection (Determination of Existence or Non-Existence of Malfunction of Diesel Particulate Filter)

If the DPF 6 malfunctions, a PM discharge amount that gets through the DPF 6 and is discharged to the downstream side of the DPF 6 increases. Accordingly, in a case where the DPF 6 is malfunctioning, a PM accumulation amount that accumulates between the electrodes 20 and 22 of the PM sensor 14 gradually increases, and the sensor output increases by a corresponding amount. Therefore, malfunction detection with respect to the DPF 6 can be performed based on the sensor output.

Figure 3:
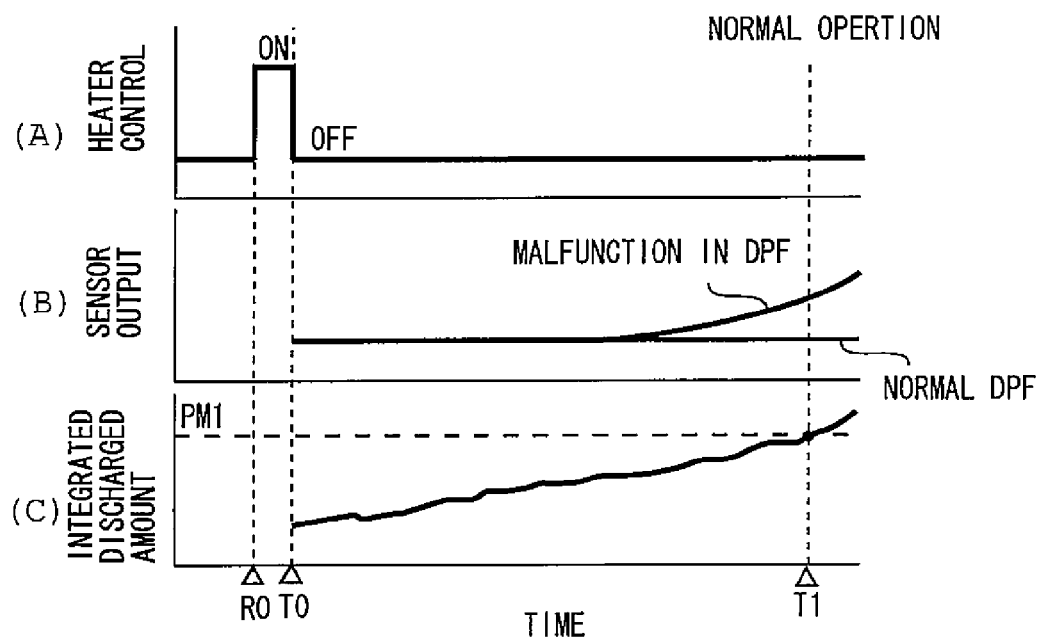
FIG. 3 is a view for describing malfunction detection control of the DPF 6 at a time of normal operation according to Embodiment 1 of the present invention.

FIG. 3 is a timing chart for describing malfunction detection control of the DPF 6 at a time of normal operation according to Embodiment 1 of the present invention. In the timing chart in FIG. 3, the horizontal axis represents time. Further, in FIG. 3, (A) represents the timing of heater control, (B) represents the sensor output, and (C) represents an integrated discharge amount.

As shown in FIG. 3, when performing malfunction detection with respect to the DPF 6 at a time of normal operation, electric power is supplied to the heater during a period between times R0 and T0 before the start of malfunction detection to thereby execute PM resetting. As a result, PM that had accumulated at the element portion is removed. Thereafter, at the time T0, the supply of electric power to the heater is turned off.

At the same time that the heater is turned off, at the time T0, a trapping voltage is applied to the PM sensor 14 and malfunction detection is started. After application of the trapping voltage starts, the sensor output is detected at a timing (first timing) T1 at which an integrated value (integrated discharge amount) of PM amounts estimated as being discharged from the internal combustion engine 2 reaches a reference amount PM1. The detected sensor output and a reference output REF_1 that serves as a basis for determination are compared, and if the sensor output is greater than the reference output REF_1 it is determined that there is a malfunction in the DPF 6.

Note that, the integrated discharge amount is calculated in accordance with a predetermined model in which, for example, the number of engine revolutions, the torque, the EGR and the like of the internal combustion engine 2 are taken as parameters. The reference amount PM1 is set to an amount of PM that is necessary for an output to be emitted in accordance with a PM amount that is accumulated in the PM sensor 14, and that is considered to be sufficient for determining the existence or non-existence of a malfunction of the DPF 6, and is previously stored in the control device 16. Further, the reference output REF_1 that serves as a basis for determining the existence or non-existence of a malfunction is set to an appropriate value that is acceptable in a case where the DPF 6 is normal or a value in which an acceptable error amount is included in a sensor output in accordance with an integrated value of a discharge amount of PM on a downstream side of the DPF 6. The reference output REF_1 is previously stored in the control device 16.

Note that, it is assumed that, for convenience, in the following embodiment the malfunction detection control that determines the existence or non-existence of a malfunction of the DPF 6 based on the sensor output at the first timing T1 that is shown in the aforementioned FIG. 3 is referred to as malfunction detection control at a "normal time".

[Characteristic Control of Present Embodiment 1]

The SCR system 8 is provided in the present embodiment 1. In the SCR system 8, urea water is injected from the injection valve 10 into the exhaust passage 4. Ammonia ($NH_3$) is generated from the urea water as a result of a thermal decomposition reaction represented by the following formula (1) and a hydrolysis reaction represented by the following formula (2).

$$CO(NH_2)_2 \rightarrow NH_3 + HCNO \quad (1)$$

$$HCNO + H_2O \rightarrow NH_3 + CO_2 \quad (2)$$

Figure 4:
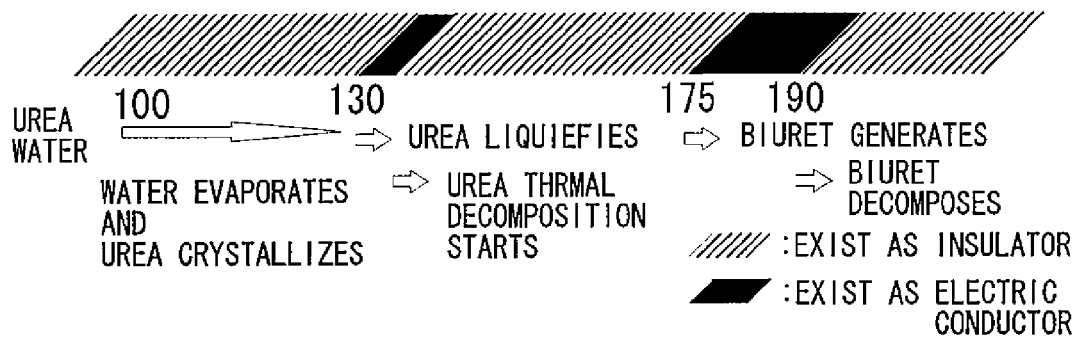
FIG. 4 is a view for describing a change in state with respect to the temperature of urea water.

FIG. 4 is a view for describing a change in state with respect to the temperature of urea water as a sample. As shown in FIG. 4, although the urea water exists in the state of liquid urea water at a temperature lower than approximately 100° C., when the temperature exceeds approximately 100° C., the water content evaporates and the urea crystallizes. When the temperature reaches approximately 130° C., the urea liquefies. Further, at approximately 135° C., the sample starts to undergo a thermal decomposition reaction (the aforementioned formula (1)). In the temperature range between approximately 130 and 135° C., the urea is in a liquid state. When the temperature reaches approximately 135° C., the urea vaporizes and enters the thermally decomposed state of the above described (1). In addition, the urea and isocyanic acid (HCNO) react at approximately 165° C. and generation of biuret ($C_2H_5N_3O_2$) begins. In addition, the sample including biuret becomes a liquid in a temperature range of approximately 175 to 190° C., and thereafter the biuret is decomposed when the temperature reaches approximately 190° C., and in a temperature range of temperatures higher than 190° C. the sample is adequately decomposed as described in the above (1) and (2) and ammonia is generated.

The NOx catalyst 12 reduces NOx by using the ammonia generated from the urea water as described above as a reducing agent, to thereby purify the exhaust gas. However, if the thermal decomposition reaction (1) or the hydrolysis reaction (2) of the urea water is in an inadequate state, in the NOx catalyst 12, in some cases urea or substances derived from urea water such as isocyanic acid and biuret (hereunder, also referred to as "urea-related substances") generated in the reaction process are discharged to downstream of the NOx catalyst 12 in a state in which the urea-related substances cannot be used as a reducing agent. In the following embodiment, it is assumed that the term "urea-related substances" that are derived from the urea water describes substances that do not include PM produced by operation of the internal combustion engine 2 as described above, and is used to differentiate such substances from the PM.

If urea-related substances discharged to downstream of the NOx catalyst 12 accumulates at the electrodes 20 and 22 of the PM sensor 14, the urea-related substances change the electrical conductivity of the electrodes 20 and 22 and cause the sensitivity of the electrodes 20 and 22 to decrease. In this case, it is considered that the correlation between the sensor output and the PM amount contained in exhaust gas disappears, and the sensor output abruptly fluctuates and the sensitivity decreases independently of changes in the PM amount. In such case, it is difficult to stably execute malfunction detection with respect to the DPF 6 or the like with a high degree of accuracy. Accordingly, it is desirable to remove urea-related substances that are adhered between the electrodes 20 and 22.

In this connection, it is known that a discharge amount of urea-related substances to the downstream side of the SCR system 8 is liable to particularly increase in a specific operating state of the internal combustion engine 2. As a specific example, for example, in a case where an intake air amount Ga is large, since the flow of exhaust gas also becomes faster, urea-related substances are liable to be discharged to downstream of the SCR system 8. Similarly, in a case where the urea equivalence ratio is high, that is, when the charging amount of urea that is introduced from the injection valve 10 is large, or in a case where the temperature of the NOx catalyst 12 is low or the like, urea-related substances are also liable to be discharged to downstream of the SCR system 8.

When the PM sensor 14 is used for a certain period of time or more in an operating state in which a discharge amount of urea-related substances is liable to be large in this manner, it is expected that, in particular, a large amount of urea-related substances will adhere to the element portion, and the influence on the sensor output will increase.

[Characteristic Control of Present Embodiment]

Figure 5:
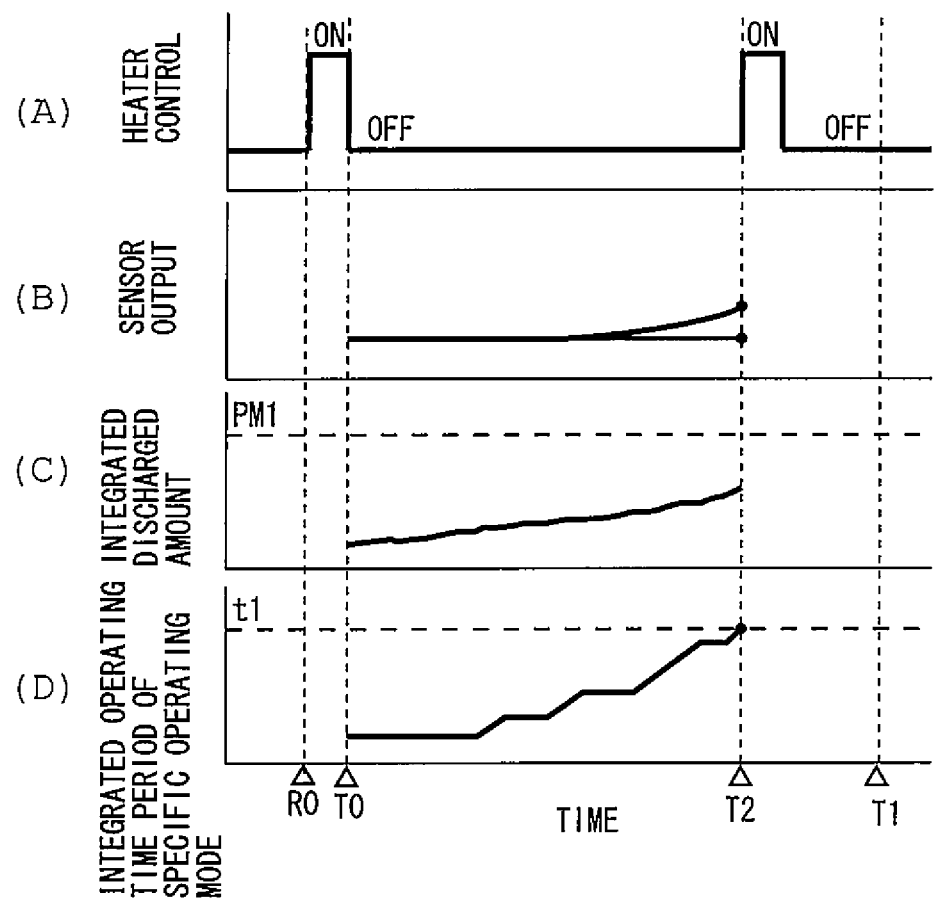
FIG. 5 is a view for describing control in Embodiment 1 of the present invention.

Therefore, in the system of the present embodiment, the above described normal control of the DPF 6 and control described hereunder that takes into consideration the influence of adherence of urea-related substances are combined and executed. FIG. 5 is a timing chart for describing control in Embodiment 1 of the present invention. In the timing chart in FIG. 5, the horizontal axis represents time. Further, in FIG. 5, (A) represents heater control, (B) represents the sensor output, (C) represents an integrated discharge amount, and (D) represents an integrated operating time period in a specific operating mode.

According to the present embodiment, a specific operating mode is defined in which urea-related substances are liable to be discharged from the SCR system 8. Further, an integrated value (integrated operating time period) of time periods in which the internal combustion engine 2 operated in a mode that satisfies a condition corresponding to the specific operating mode is counted. If the integrated operating time period reaches a reference time period t1, it is determined that the accumulation amount of urea-related substances at the element portion of the PM sensor 14 has increased to a level that can no longer be ignored.

In this case, as shown in FIG. 5, in a case where a timing T2 (second timing) at which the integrated operating time period reaches the reference time period t1 is earlier than the first timing T1 at which the sensor output is acquired for detecting a malfunction of the DPF 6 at a normal time, determination of the existence or non-existence of a malfunction of the DPF 6 is performed at the second timing T2. That is, the sensor output is acquired at the second timing T2, and if the sensor output is already greater than the reference output REF_1 at that stage, it is determined that there is a malfunction in the DPF 6.

However, if a malfunction of the DPF 6 is not recognized when the determination is made at the second timing T2, malfunction detection with respect to the DPF 6 is temporarily cancelled without determining that the DPF 6 is "normal". More specifically, the heater is turned on, PM resetting is performed, and PM accumulated at the PM sensor 14 is removed. When performing the PM resetting, the element portion is heated to a high temperature between approximately 500 and 700° C. Accordingly, urea-related substances are also removed together with the PM. In a state in which PM resetting had been performed in this manner, the malfunction detection with respect to the DPF 6 is performed once again.

In contrast, if a timing at which the integrated operating time period reaches the reference time period t1 is later than the first timing T1 of malfunction detection control at a normal time, similarly to the situation described with respect to FIG. 3, malfunction detection for a normal time is executed with respect to the DPF 6. That is, the sensor output is acquired at the first timing T1, and if the sensor output is greater than the reference output REF_1 it is determined that there is a malfunction in the DPF 6, while if the sensor output is less than the reference output REF_1 it is determined that the DPF 6 is normal.

Note that, in the above described control, an operating condition that is taken as a specific operating mode in which urea-related substances are liable to be discharged is determined in advance by experimentation or the like and stored in the control device 16. Further, experimentation or the like is also used to determine a range of operating time periods for which it is expected that, in a case where the combustion engine 2 is operated for such time periods in the set specific operating mode, urea-related substances will accumulate at the element portion to an extent that causes deviations that cannot be ignored in the sensor output. The reference time period t1 with respect to the integrated operating time period for which the combustion engine 2 operated in the specific operating mode is set to a value in the vicinity of the lower limit value of the operating time period range, and is previously stored in the control device 16.

[Specific Control of Embodiment 1]

Figure 6:
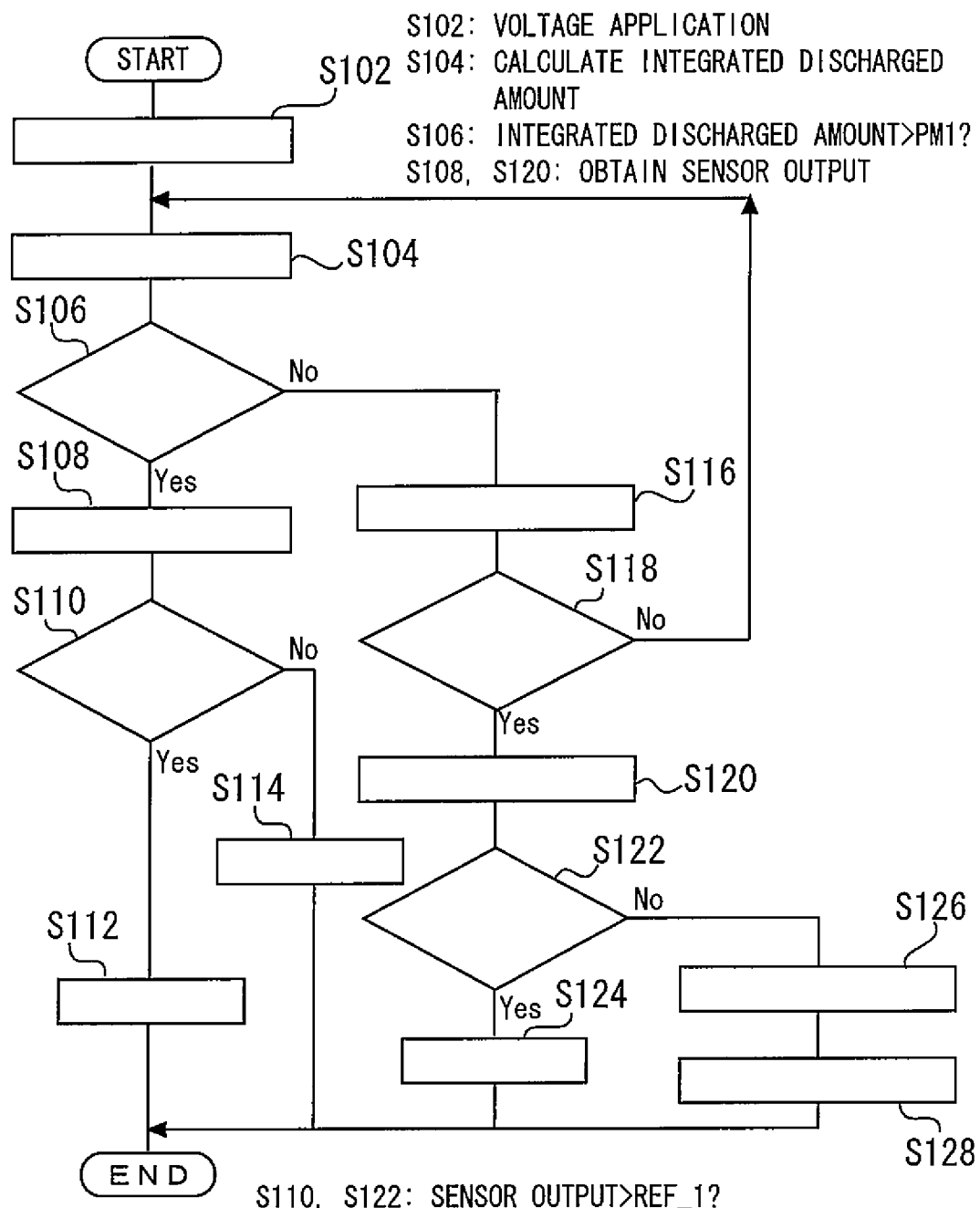
FIG. 6 is a flowchart for describing a routine of specific control that the control device executes in Embodiment 1 of the present invention.

FIG. 6 is a flowchart for describing a routine of specific control that the control device executes in the present invention. The routine in FIG. 6 is a subroutine that is executed when an instruction to start malfunction detection with respect to the DPF 6 is detected. As shown in FIG. 6, upon detection of an instruction to start malfunction detection, first, application of a trapping voltage to the electrodes 20 and 22 is started (S102). The trapping voltage is applied through a power supply circuit from a predetermined power source by means of a control signal from the control device 16.

Next, an integrated discharge amount is calculated (S104). As described above, the integrated discharge amount is calculated in accordance with a model that takes the number of engine revolutions or load or the like as a parameter. The integrated discharge amount calculated here is an estimated value of the total PM amount discharged from the internal combustion engine 2 after the start of the malfunction detection.

Next, the control device 16 determines whether or not the integrated discharge amount is greater than the reference amount PM1 (S106). If it is determined that the integrated discharge amount is greater than the reference amount PM1, the control device 16 executes the determination of the existence or non-existence of a malfunction for a normal time of FIG. 3 that is described above. In this case, first, the sensor output is acquired (S108). Next, it is determined whether or not the acquired sensor output is greater than the reference output REF_1 (S110).

In step S110, if it is found that the relationship "sensor output>reference output REF_1" holds, the control device 16 determines there is a malfunction at the DPF 6 (S112). On the other hand, if it is found that the relationship "sensor output>reference output REF_1" does not hold, the control device 16 determines that the DPF 6 is normal (S114). After the determination in step S112 or S114, the current processing ends.

In contrast, if it is found in step S106 that the relationship "integrated discharge amount>reference amount PM1" does not hold, next, after starting the malfunction detection in step S102, the control device 16 acquires an integrated operating time period that is an integrated value of time periods for which the internal combustion engine 2 operated in the specific operating mode (S116). The integrated operating time period is, for example, acquired from a time counter that is connected to the control device 16.

Next, it is determined whether or not the integrated operating time period is greater than the reference time period t1 (S118). That is, it is determined whether or not the PM sensor 14 has been exposed for a longer time period than the reference time period t1 to an environment in which the discharge amount of urea-related substances is expected to be large. If it is found in step S118 that the relationship "integrated operating time period>reference time period t1" does not hold, the operation returns to step S104, and the processing from step S104 onwards is executed in accordance with the present routine.

In contrast, if it is found in step S118 that the relationship "integrated operating time period>reference time period t1" holds, the sensor output is then acquired (S120). Next, it is determined whether or not the sensor output is greater than the reference output REF_1 (S122).

If it is found in step S122 that the relationship "sensor output>reference output REF_1" holds, it is determined that a considerable amount of PM is already accumulated at the element portion at the second timing T2 that is earlier than the first timing T1 for normal time. Accordingly, in this case, it is determined that there is a malfunction at the DPF 6 (S124). Thereafter, the present processing ends.

On the other hand, in a case where it is found in step S122 that the relationship "sensor output>reference output REF_1" holds, according to the present embodiment the current control to detect a malfunction of the DPF 6 is temporarily cancelled without determining that the DPF 6 is normal (S126). More specifically, predetermined processing is executed such as returning the value of the integrated discharge amount and the value of the integrated operating time period and the like that were calculated and stored during the current malfunction detection to zero, and turning off application of the trapping voltage.

Next, PM resetting is executed (S128). Here, supply of electric power to the heater is performed for a predetermined time period, and the temperature of the element portion is raised to the temperature for a time of executing PM resetting. As a result, PM that accumulated at the element portion is removed together with urea-related substances. Thereafter, the current processing temporarily ends.

As described in the foregoing, according to the present embodiment, the influence of urea-related substances on the element portion is taken into account in a case where an operating time period of the internal combustion engine 2 in an operating mode in which a discharge amount of urea-related substances is liable to increase has become a time period of a certain length. That is, with the exception of a case where the sensor output is greater than the reference output REF_1, the malfunction detection is cancelled and PM resetting is executed. It is thereby possible to suppress the occurrence of an erroneous determination with respect to the existence or non-existence of a malfunction of the DPF 6 due to a sensor output that is significantly affected by the influence of urea-related substances.

Further, according to the present embodiment, PM resetting is executed in a case where the integrated operating time period in the specific operating mode has reached the reference time period t1. Accordingly, the frequency of performing PM resetting can be suppressed to a small number of times, and control such as malfunction detection with respect to the DPF 6 can be performed that efficiently utilizes the sensor output.

According to the present embodiment, a case of executing malfunction detection with respect to the DPF 6 has been described as control that is also based on the output of the PM sensor 14. However, the present invention is not limited thereto, and the present invention can also be applied to a case of performing other control based on the output of the PM sensor 14. In such a case also, a first timing at which a sensor output is acquired by such control at a normal time and a second timing at which an integrated operating time period reaches a reference time period are compared in a similar manner to the above described embodiment, and if the second timing is earlier than the first timing, the relevant control is cancelled and processing such as executing PM resetting is performed. It is thereby possible to suppress the influence that deviations in the sensor output caused by urea-related substances have on the relevant control and improve the control accuracy. The same applies with respect to the embodiment described hereunder.

Further, according to the present embodiment, a case has been described in which the first timing T1 when performing malfunction detection at a normal time is taken as a timing at which the integrated discharge amount reaches the reference amount PM1. However, in the present invention a timing of acquiring a sensor output for malfunction detection with respect to the DPF 6 is not limited thereto and may be another timing. For example, a time point after a predetermined time period elapses after the malfunction detection starts (a time at which application of a trapping voltage is turned on) can be adopted as the first timing. In this case also, as described in the foregoing Embodiment 1, in the malfunction detection performed at a normal time, the sensor output is acquired at the first timing, and the existence or non-existence of a malfunction of the DPF 6 is determined based thereon. On the other hand, if the second timing is reached prior to the first timing, the sensor output is acquired at the second timing, and the existence or non-existence of a malfunction of the DPF 6 is determined based thereon. The same applies with respect to the embodiment described hereunder.

In addition, according to the present embodiment, a case has been described in which, if it is found that the relationship "sensor output>reference output REF_1" does not hold in step S122, the malfunction detection is cancelled (S126), and the routine is ended. However, according to the present invention, a configuration may also be adopted in which, for example, after the malfunction detection is cancelled (S126), and PM resetting is executed (S128), the processing returns to step S102 to start the malfunction detection once more. The same applies with respect to the embodiment described hereunder.

Furthermore, according to the present embodiment, a case has been described in which the reference output REF_1 is taken as a criterion even when determining the existence or non-existence of a malfunction of the DPF 6 based on the sensor output at either of the first timing and the second timing. However, the present invention is not limited thereto, and a configuration may also be adopted in which a reference output is set in accordance with each of the first timing and the second timing. Specifically, for example, in a case where determination of the existence or non-existence of a malfunction is performed at the second timing, a reference output with respect to a sensor output that is adapted for a situation in which the relevant timing is earlier than the first timing may be made a smaller output than the reference output REF_1 or the like. The same applies with respect to the embodiment described hereunder.

Embodiment 2

The configuration of a system and a PM sensor of the present embodiment is the same as that of the system and the PM sensor 14 illustrated in FIG. 1 and FIG. 2. The system of the present embodiment performs the same control as Embodiment 1, except that a reference time period with respect to the integrated operating time period in the specific operating mode is set in accordance with the integrated discharge amount.

Figure 7:
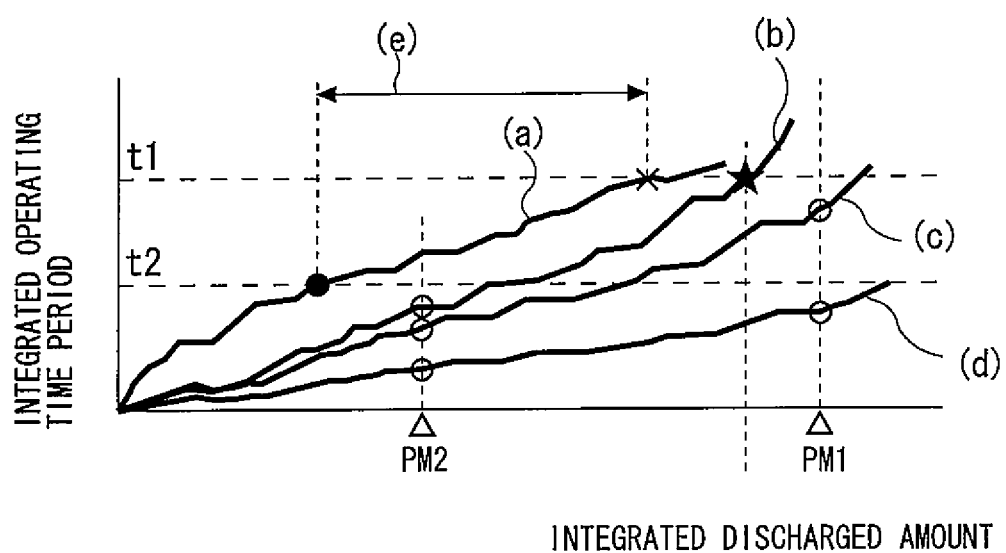
FIG. 7 is a view for describing a reference time period with respect to an integrated discharge amount of PM according to Embodiment 2 of the present invention.

FIG. 7 is a view for describing a reference time period of the integrated operating time period with respect to an integrated discharge amount according to Embodiment 2 of the present invention. In FIG. 7, the horizontal axis represents an integrated discharge amount and the vertical axis represents an integrated operating time period.

In the present embodiment, two reference amounts are established with respect to the integrated discharge amount, and a reference time period is set for respective regions that are demarcated by the two reference amounts. More specifically, among the two reference amounts with respect to the integrated discharge amount, a first reference amount PM1 that is one of the reference amounts is a reference amount for determining the first timing T1 at which to acquire the sensor output for malfunction detection with respect to the DPF 6 at a normal time, and is the same value as the reference amount PM1 in Embodiment 1. A second reference amount PM2 that is the other reference amount is a smaller value than the first reference amount PM1.

If the integrated discharge amount is in a region that is greater than the second reference amount PM2 and equal to or less than the first reference amount, the first reference time period t1 is adopted as the reference time period with respect to the integrated operating time period. The first reference time period is made the same value as the reference time period t1 in Embodiment 1.

On the other hand, if the integrated discharge amount is equal to or less than the second reference amount PM2, the second reference time period t2 is adopted as the reference time period with respect to the integrated operating time period. The second reference time period t2 is set to a smaller value than the first reference time period t1.

For example, in a case where there are many operating time periods in the specific operating mode and a rate of increase in the integrated operating time periods is large, as shown by a line (a), the integrated operating time period in the specific operating mode reaches the second reference time period t2 while the integrated discharge amount is less than or equal to the second reference amount PM2. In a case where the integrated operating time period reaches a small reference value t2 while the integrated discharge amount is small, the sensor output is acquired at that timing and determination of the existence or non-existence of a malfunction is performed with respect to the DPF 6.

For instance, in the example shown by a line (b), although the integrated operating time period does not reach the second reference time period t2 when the integrated discharge amount is in a region that is equal to or less than the second reference amount PM2, the integrated operating time period in the specific operating mode arrives at the first reference time period t1 while the integrated discharge amount is in a region in which the integrated discharge amount is greater than the second reference amount and less than or equal to the first reference amount PM1. In such a case, at the timing at which the first reference time period t1 is reached, the sensor output is acquired and determination of the existence or non-existence of a malfunction of the DPF 6 is performed.

Similarly to the case of Embodiment 1, if a malfunction of the DPF 6 is not found by the determination of the existence or non-existence of the malfunction in the cases represented by line (a) and line (b), the malfunction detection is cancelled and PM resetting is executed.

For instance, in the example represented by the line (a), in comparison to a case where, as in Embodiment 1, malfunction determination with respect to the DPF 6 or the like is performed when the integrated operating time period reaches the reference time period t1, execution of malfunction determination with respect to the DPF 6 or PM resetting is advanced by the period indicated by an arrow (e). That is, in a case where operation in the specific operating mode accounts for a large proportion of the operation of the internal combustion engine 2, PM resetting is efficiently performed, and malfunction determination with respect to the DPF 6 is also performed.

In contrast, according to the examples represented by lines (c) and (d), even at the first timing T1 at which the integrated discharge amount reaches the reference amount PM1, the integrated operating time period in the specific operating mode has not reached the first reference time period t1. In such a case, the sensor output is acquired at the first timing T1 for acquiring the sensor output at a normal time, and determination of the existence or non-existence of a malfunction of the DPF 6 is executed.

Figure 8:
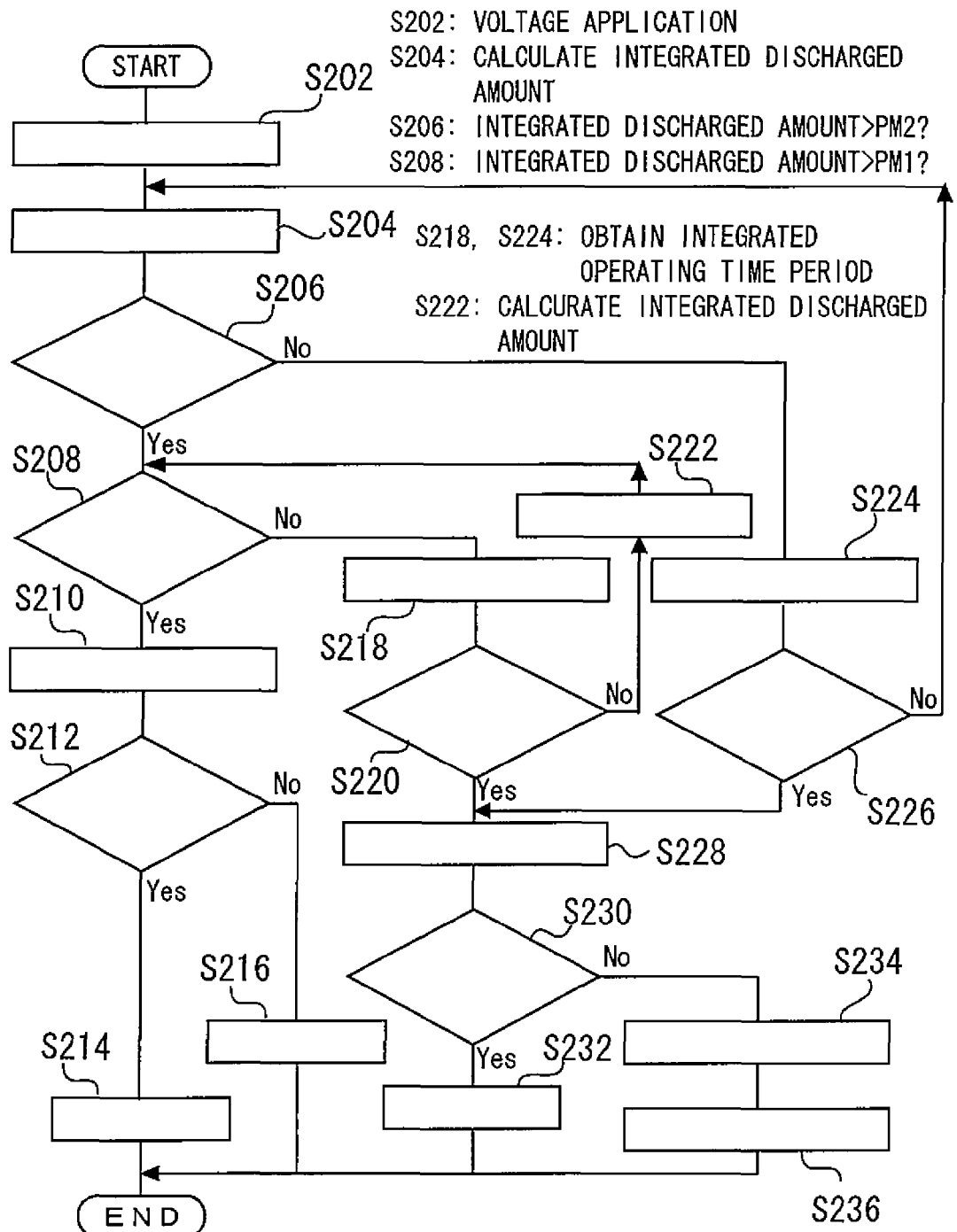
FIG. 8 is a view for describing a routine of control that the control device executes in Embodiment 2 of the present invention.

FIG. 8 is a view for describing a routine of control that the control device 16 executes in Embodiment 2 of the present invention. The flowchart in FIG. 8 is a subroutine that is executed when an instruction to perform malfunction detection with respect to the DPF 6 is issued. When the routine in FIG. 8 starts, similarly to S102 and S104 of FIG. 6, first, a trapping voltage is applied between the electrodes 20 and 22 (S202), and an integrated discharge amount is calculated (S204).

Next, the control device 16 determines whether or not the integrated discharge amount is greater than the second reference amount PM2 (S206). The second reference amount PM2 is a value that is previously stored in the control device 16. Here, if it is found that the relationship "integrated discharge amount>second reference amount PM2" holds, next the control device 16 determines whether or not the integrated discharge amount is greater than the first reference amount PM1 (S208). The first reference amount PM1 is a reference value for determining the detection timing at which to detect the sensor output when performing malfunction detection with respect to the DPF 6 for a normal time, and is previously stored in the control device 16.

In step S208, if it is found that the relationship "integrated discharge amount>first reference amount PM1" holds, similarly to S108 to S114 in FIG. 6, malfunction detection with respect to the DPF 6 for a normal time is executed. That is, the sensor output is acquired at the first timing T1 (S210), it is determined whether or not the sensor output is greater than the reference output REF_1 (S212), and if it is found that the relationship "sensor output>reference output REF_1", it is determined that there is a malfunction at the DPF 6 (S214). On the other hand, if it is found that the relationship "sensor output>reference output REF_1" does not hold, it is determined that the DPF 6 is normal (S216).

In contrast, if it is found in step S208 that the relationship "integrated discharge amount>first reference amount PM1" does not hold, the current integrated discharge amount is in a region of amounts that are greater than the second reference amount PM2 and equal to or less than the first reference amount PM1. In this case, first, the integrated operating time period is acquired (S218). The integrated operating time period is an integrated value of time periods in which the internal combustion engine 2 is operated under the specific operating mode after the start of voltage application in step S202.

Next, it is determined whether or not the value of the integrated operating time period is greater than the first reference time period t1 (S220). The first reference time period t1 is a value that is previously stored in the control device 16. In step S220, if it is found that the relationship "integrated operating time period>first reference time period t1" does not hold, the current integrated discharge amount is calculated (S222), and thereafter the operation returns to the processing in step S208.

Further, in step S206, if it is found that the relationship "integrated discharge amount>second reference amount PM2" does not hold, similarly, the integrated operating time period is acquired (S224). Next, it is determined whether or not the acquired value of the integrated operating time period is greater than the reference time period t2 (S226). In step S226, if it is found that the relationship "integrated operating time period>second reference time period t2" does not hold, the operation returns to step S204.

By the above described processing, if it is found in step S220 that the relationship "integrated operating time period>first reference time period t1" holds, or that in step S226 the relationship "integrated operating time period>second reference time period t2" holds, it is expected that the amount of urea-related substances accumulating at the element portion will increase to an extent degree that cannot be ignored. Accordingly, in such cases, first the sensor output is acquired (S228), and it is determined whether or not the acquired sensor output is greater than the reference output REF_1 (S230). Here, if it is found that the relationship "sensor output>reference output REF_1" holds, it is determined that there is a malfunction at the DPF 6 (S232). Thereafter, the current processing ends.

In contrast, in step S230, if it is found that the relationship "sensor output>reference output REF_1" does not hold, the current malfunction detection with respect to the DPF 6 is cancelled (S234). That is, application of the voltage is turned off, and predetermined processing is executed such as returning to zero the values for the integrated operating time period and the integrated discharge amount and the like that were counted in the current routine. Next, PM resetting is executed (S236). Thereafter, the current processing ends.

As described above, according to the present embodiment, a reference time period with respect to an integrated operating time period is set to two stages in accordance with an integrated discharge amount, with the reference time period with respect to the integrated operating time period being set to a short time period at a stage at which the integrated discharge amount is small. It is thereby possible to advance the timing of executing malfunction detection for the DPF 6 or PM resetting to correspond with an increase in an operating time period in a specific operating mode. Thus, PM resetting is executed at an earlier stage in a case where a large amount of urea-related substances is discharged. Accordingly, opportunities for performing malfunction detection for the DPF 6 can be effectively secured.

Note that, according to the present embodiment a case has been described in which two reference amounts are set with respect to the integrated discharge amount, and a reference time period is divided into two stages in accordance with the two reference amounts. However, the present invention is not limited thereto, and a configuration may also be adopted in which a plurality of stages of two or more are set with respect to a reference time period in accordance with an integrated discharge amount. In this case, the reference time period is set so as to gradually increase as the integrated discharge amount increases. It is thereby possible to efficiently perform PM resetting, and secure opportunities for malfunction detection with respect to the DPF 6.

Figure 9:
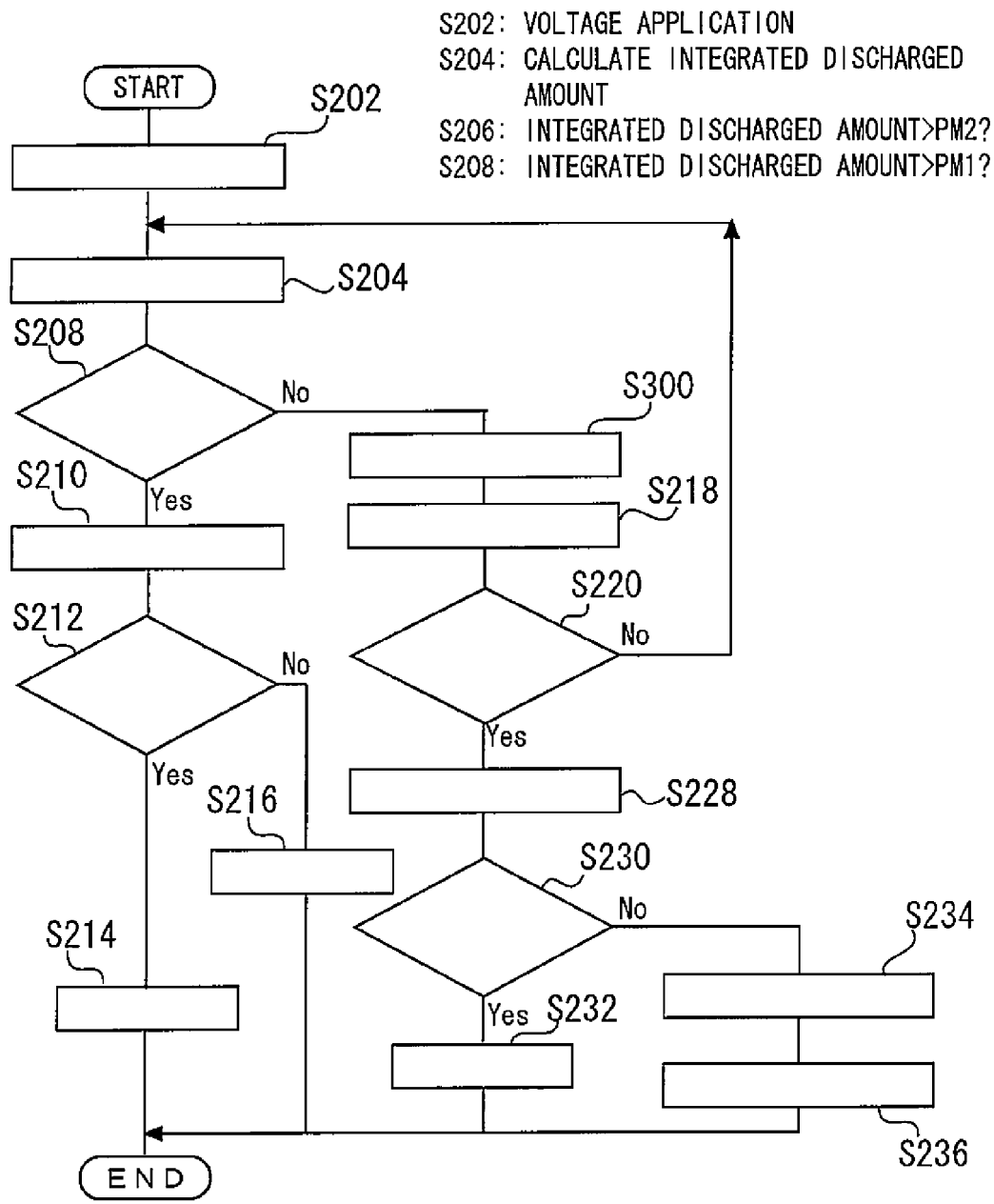
FIG. 9 is a flowchart for describing another control routine that is executed by the control device in Embodiment 2 of the present invention.

Further, the present invention is not limited to a configuration in which reference time periods are set in stages. FIG. 9 is a flowchart for describing another control routine that is executed by the control device 16 in Embodiment 2 of the present invention. The routine in FIG. 9 is the same as the routine in FIG. 8 except that the routine in FIG. 9 does not include the processing in step S206 and steps S222 to S226, and includes processing in a step S300 prior to step S218.

In the routine in FIG. 9, after calculating the integrated discharge amount (S204), the processing in step S208 is performed to determine whether or not the integrated discharge amount is greater than the first reference amount PM1, and processing is not performed to determine whether or not the integrated discharge amount is greater than the second reference amount PM2.

If the result determined in step S208 is that the integrated discharge amount is not greater than the first reference amount PM1, next, a reference time period tx is set in accordance with the integrated discharge amount calculated in step S204 (S300). The reference time period tx is set so as to be a value that increases as the integrated discharge amount increases. The specific relationship between the reference time period and the integrated discharge amount is determined by experimentation, and is previously stored as a map or function in the control device 16.

Thereafter, similarly to the routine shown in FIG. 8, after acquiring the integrated operating time period (S218), in step S220 it is determined whether or not the integrated operating time period is greater than the reference time period tx (S220). In this case, if it is found that the relationship "integrated operating time period>reference time period tx" does not hold, the operation returns to step S204.

In contrast, in step S220, if it is found that the relationship "integrated operating time period>reference time period tx" holds, the control device 16 executes the processing in steps S228 to S236, that is, processing to acquire the sensor output at a timing at which it is recognized that the integrated operating time period has reached the reference time period tx (S228), and to perform a malfunction determination based thereon, and the other processing.

It is to be understood that even when the number, quantity, amount, range or other numerical attribute of an element is mentioned in the above description of the embodiments, the present invention is not limited to the mentioned numerical attribute unless it is expressly stated or theoretically defined. Further, structures or manufacturing processes of the like described in conjunction with the embodiments are not necessarily essential to the present invention unless expressly stated or theoretically defined.

DESCRIPTION OF REFERENCE NUMERALS 2 internal combustion engine
4 exhaust passage
6 DPF (diesel particulate filter for trapping the particulate matter)
8 SCR system
10 injection valve
12 NOx catalyst
14 PM sensor (particulate matter sensor)
16 control device
18 insulating substrate
20, 22 electrode
PM1 first reference amount
PM2 second reference amount
t1 first reference time period
t2 second reference time period
REF_1 reference output
T1 first timing
T2 second timing

The invention claimed is:
1. An electronic control device for an internal combustion engine that is applied to an internal combustion engine comprising a diesel particulate filter and a selective catalytic reduction (SCR) system disposed in an exhaust passage, and a particulate matter sensor disposed downstream of the diesel particulate filter and the SCR system, the electronic control device comprising:

means for applying a particulate trapping voltage to the particulate matter sensor;

means for determining, if a first timing is reached after starting application of the particulate trapping voltage, whether or not there is a malfunction in the diesel particulate filter, in accordance with an output of the particulate matter sensor;

means for stopping the determination of the malfunction in the diesel particulate filter if a second timing is reached, the second timing being earlier than the first timing and the second timing being a time at which an integrated operating time period, during which the internal combustion engine is in a predetermined operating state where urea-related substances that are discharged downstream of the SCR system increase, reaches a reference time period; and means for, if the second timing is reached, raising a temperature of an element portion of the particulate matter sensor to thereby combust and remove particulate matter that accumulates in the particulate matter sensor.

2. The electronic control device for an internal combustion engine according to claim 1, further comprising means for estimating an integrated discharge amount that is an integrated amount of particulate matter discharged from the internal combustion engine after starting application of the particulate trapping voltage, wherein the first timing is a time at which the integrated discharge amount reaches a reference amount.

3. The electronic control device for an internal combustion engine according to claim 1, further comprising:

means for estimating an integrated discharge amount that is an integrated amount of particulate matter discharged from the internal combustion engine after starting application of the particulate trapping voltage; and means for setting the reference time period in accordance with the estimated integrated discharge amount.

4. An electronic control device for an internal combustion engine that is applied to an internal combustion engine comprising a diesel particulate filter and a selective catalytic reduction (SCR) system disposed in an exhaust passage, and a particulate matter sensor disposed downstream of the SCR system, the electronic control device programmed to:

control a power supply to apply a particulate trapping voltage to the particulate matter sensor;

determine, if a first timing is reached after starting application of the particulate trapping voltage, whether or not there is a malfunction in the diesel particulate filter, in accordance with an output of the particulate matter sensor;

stop the determination of the malfunction in the diesel particulate filter if a second timing is reached, the second timing being earlier than the first timing and the second timing being a time at which an integrated operating time period, during which the internal combustion engine is in a predetermined operating state where urea-related substances that are discharged downstream of the SCR system increase, reaches a reference time period; and if the second timing is reached, control another power supply to raise a temperature of an element portion of the particulate matter sensor to thereby combust and remove particulate matter that accumulates in the particulate matter sensor.

5. The electronic control device for an internal combustion engine according to claim 4, further programmed to estimate an integrated discharge amount that is an integrated amount of particulate matter discharged from the internal combustion engine after starting application of the particulate trapping voltage, wherein the first timing is a time at which the integrated discharge amount reaches a reference amount.

6. The electronic control device for an internal combustion engine according to claim 4, further programmed to:

estimate an integrated discharge amount that is an integrated amount of particulate matter discharged from the internal combustion engine after starting application of the particulate trapping voltage; and set the reference time period in accordance with the estimated integrated discharge amount.

\* \* \* \* \*